Feb. 1, 1955 B. A. SCHWARZ ET AL 2,701,330

MOTOR OPERATED TUNING MEANS

Filed Oct. 31, 1950 6 Sheets-Sheet 1

Inventors
Bertram A. Schwarz &
Manfred C. Wright
By
Willits, Helwig & Baillio
Attorneys Feb. 1, 1955 B. A. SCHWARZ ET AL 2,701,330

MOTOR OPERATED TUNING MEANS

Filed Oct. 31, 1950 6 Sheets-Sheet 2

Inventors

Feb. 1, 1955 B. A. SCHWARZ ET AL 2,701,330

MOTOR OPERATED TUNING MEANS

Filed Oct. 31, 1950 6 Sheets-Sheet 3

Inventors
Bertram A. Schwarz &
Manfred A. Wright
By
Willits, Helwig & Baillio
Attorneys Feb. 1, 1955 B. A. SCHWARZ ET AL 2,701,330

MOTOR OPERATED TUNING MEANS

Filed Oct. 31, 1950 6 Sheets-Sheet 4

Inventors
Bertram A. Schwarz &
Manfred G. Wright
By
Willits, Helwig & Baillio
Attorneys

MOTOR OPERATED TUNING MEANS

Filed Oct. 31, 1950 6 Sheets-Sheet 5

Inventors
Bertram A. Schwarz &
Manfred G. Wright
By
Willits, Helwig & Baillio
Attorneys Inventors
Bertram A. Schwarz &
Manfred G. Wright
By
Willits, Helwig & Baillio
Attorneys

United States Patent Office 2,701,330

Patented Feb. 1, 1955

2,701,330

MOTOR OPERATED TUNING MEANS

Bertram Anton Schwarz and Manfred G. Wright, Kokomo, Ind., assignors to General Motors Corporation, Detroit, Mich., a corporation of Delaware Application October 31, 1950, Serial No. 193,148

9 Claims. (Cl. 318—127)

This invention relates to means for tuning radio receivers over a predetermined portion of the spectrum and more particularly to automatic indexing means for stopping said tuning means on desired stations upon receipt of an incoming signal. Radio broadcast receivers are normally equipped with manually movable means, the movement of which in turn moves one part of a tuning assembly to cause the radio receiver to be tuned to various frequencies in sequence over the band. The tuning means itself may take the form of a variable condenser or a variable inductance, but for both there must be provided relatively movable parts, the relative motion of which creates a change in capacity or inductance to tune the associated resonant circuits to different frequencies and thus tune the receiver to different incoming stations.

After radio receivers having what might be termed straight manual tuning had been an the market for some time, "push button" tuners were introduced in which a plurality of buttons carried on the ends of movable arms mounted in the radio chassis were provided, the movement of which selectively moved the tuning means to different positions associated with desired radio stations and, depending upon the mechanical adjustment of parts, to different positions. These mechanical parts could be adjusted and then locked in position so that each time the push button was moved, the set would be turned to a given station. If it were desired to have any one of these push buttons set to a new and different station, the mechanical means had to be unlocked, the set tuned, the mechanical means re-set and locked, and thereafter it would tune in the new station.

However, in the operation of radio receivers which are mounted on automotive vehicles, it was found that the daytime range is relatively limited and, therefore, the driver, if he were attempting a trip of any distance, would soon find that the stations set up on his push buttons were no longer available, and would either have to re-set to a new series of stations in his area at the moment or use the straight manual tuner still available.

Tuning means have been devised to overcome the necessity for previously adjusting or setting devices for incoming stations. These tuning systems have been called "stop-on-signal" tuners or "signal tuning tuners" and are actuated by the presence and strength of an incoming signal in the receiver itself and of course do not require any mechanical preadjustment. They tune the set accurately to an incoming carrier which is transmitting and otherwise scan the spectrum.

It is an object of our invention to provide a tuning mechanism for high frequency transmission receiver means actuated to index by the presence of an incoming transmitted wave.

It is a further object of our invention to provide a signal actuated tuning means which scans the frequency spectrum in one direction and is quickly returned to the opposite limit of travel, the indexing means being operative only in the scanning direction of movement.

It is a further object of our invention to provide a power operated signal indexing tuning mechanism that may also be manually tuned.

It is a further object of our invention to provide a signal actuated tuning means having novel speed control and indexing means for stopping the same.

It is a still further object of our invention to provide a signal actuated tuning means having a speed control and indexing means including a differential drive also operable by manual means.

With these and other objects in view which will become more apparent as the specification proceeds, our invention may be better understood by reference to the following specification and claims and the illustrations in the accompanying drawings in which:

Figure 1:
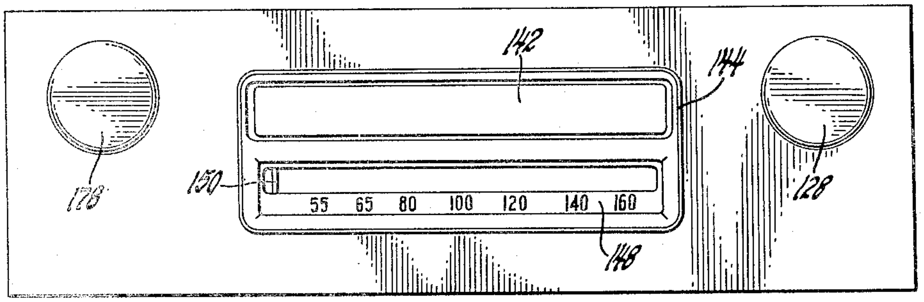
Figure 1 is a front elevation of the control panel of a radio receiver embodying our invention.

As previously mentioned the type of tuner herein described is that designed to scan a frequency spectrum, which in this case is the radio broadcast spectrum but which obviously may be any desired span, and to stop or index at any point in the spectrum where a signal is received, solely by the appearance of said signal in the system. In order to cause said apparatus to scan the band for which it was designed there is provided tuning means 2 supported on a frame 4. The tuning means consists of a set of inductances or coils 6 which are connected into the various resonant circuits of the receiver. The variation in the inductance values of these coils is provided by comminuted iron cores 8 and commonly mounted on a movable cross bar 10 which has slot 12 in one end riding on track section 14 of the frame 4.

A longitudinal rod 16 mounted in the frame parallel to the track section and approximately halfway between the two side frame members, extends through an opening in the cross bar 10 and acts as an additional support and guide. Thus movement of the bar along the track and rod either plunges the cores 8 into or retracts them from their associated coils 6 depending on the direction of movement and thus tunes the receiver.

Some of the earlier forms of signal actuated tuners had the movable tuning means actuated by small electric motors and tuned slowly in both directions over the band. The present design does not provide two-way scanning but instead provides a scanning action and indexing control in one direction only, namely from the low frequency to the high frequency end of the band and then a quick return to the low frequency end during which the indexing means is disabled. The cross bar 10 is therefore provided with means to drive it relatively slowly toward the front of the tuner and away from the coils and then quickly return it to a position adjacent the coils again in which the cores are inserted to the maximum distance within their associated coils.

The driving force for the tuning movement is provided generally by energy stored in a resilient means, the motion being slowed down to a satisfactory rate by a gear train load and a governor. When the resilient means has expended the energy stored therein a cocking means is provided to recharge the same and this recocking action is quickly performed and physically moves the parts back to the beginning of the tuning motion cycle.

A plate 18 having a large opening 20 therein has an upturned flange 22 at one end, a pair of spaced upturned flanges 24 near the opposite end and a central flange 26 extending beyond the two flanges 24 and between them. The flanges 24 are rigidly secured to the rear face of the cross bar 10 by any suitable means to form a unitary assembly of the two parts. The flanges 22 and 26 are aligned on the longitudinal axis of the plate 18 and are provided with openings therein through which the rod 16 projects. Plate 18 therefore provides further support for the bar 10 on the rod 16 and also connection to the driving means.

The top plate 28 of the frame 4 has rigidly connected thereto in spaced parallel relation by bolts 34 two plates, 30 and 32, which act as a mounting for the gear train assembly. A shaft 36 is rotatably supported in aligned openings in the plates 30 and 32 and extends beyond both plates for a short distance. A plurality of gears 38, 40 and 42 and spacers 44 and 46 are all mounted on the shaft. Gear 38 and pinion 40 are secured together to rotate as a unit but are loose on the shaft. Spacer 46 and gear 42 are rigidly secured to the shaft and rotate therewith. A second shaft 48 parallel to the shaft 36 is also rotatably mounted in the two plates and carries a gear 50 and a pinion 52 fixedly secured thereto. A third shaft 54 likewise rotatably mounted in the plates completes the gear train carried thereby. On this shaft are fixedly mounted a pinion 56 and an air governor 58 consisting of a plurality of fan blades affixed to a hub. The gear train from shaft 36 to the air governor may be identified as follows: gear 38, pinion 52, gear 50 rotatable therewith and pinion 56 to the governor.

A planetary carriage for supporting gears in planetary relation to those on shaft 36 is provided by two spaced plates 60 and 62 held in desired relation by a plurality of bolts 63. These two plates are spaced farther apart than plates 30 and 32 and project over and under the first plate assembly. The two plates are not of the same configuration but have different projecting portions for connecting to the carriage the other operating parts. The plates 60 and 62 are provided with aligned openings 64 and 66 through which the projecting ends of shaft 36 are adapted to pass thus providing a pivot for the planetary carriage on the gear train housing.

Figures 7, 8, 9, 10:
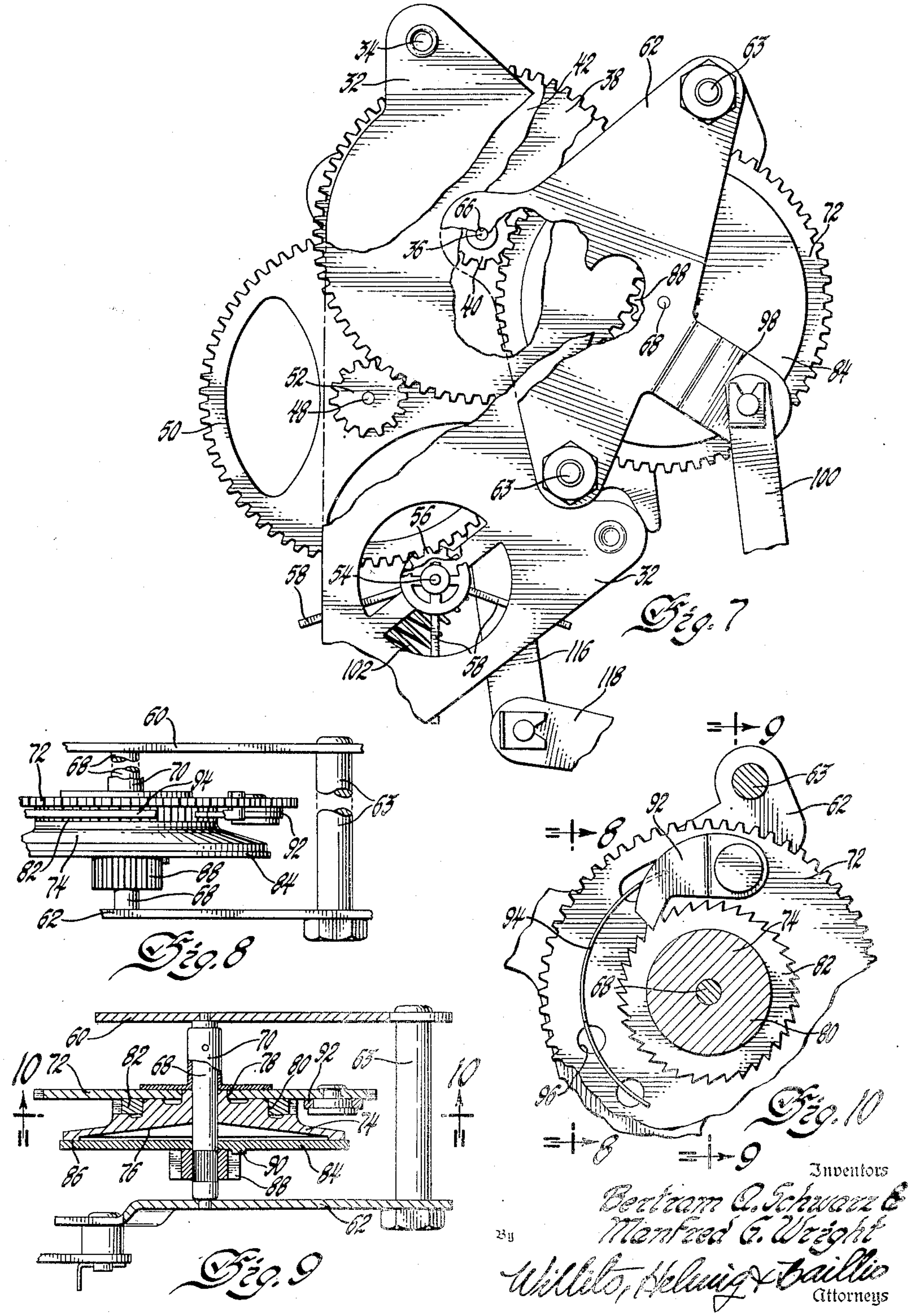
Figure 7 is a bottom plan view of the gear train and planetary assembly taken on the line 7—7 of Figure 6 in the direction of the arrows showing the reverse side to that shown in Figure 5 with parts broken away.
Figure 8 is a detail elevation of the shaft and gearing carried by the planetary carriage taken on line 8—8 of Figure 10 in the direction of the arrows.
Figure 9 is a sectional view of the planetary gear assembly taken on lines 9—9 of Figure 10 and Figure 5.
Figure 10 is a sectional view taken on the line 10—10 of Figure 9.

The planetary carriage is also provided with a second pair of aligned openings in which a shaft 68 is rotatably supported. The details of the assembly carried on shaft 68 are best shown in Figures 8, 9 and 10. A flanged sleeve 70 is staked to the shaft 68 and loosely confines large gear wheel 72. A circular wheel 74 having one side face of a dished contour as shown at 76 is mounted on said shaft but may be rotated with respect thereto. The wheel 74 has an axially extending hub 78 on the opposite side from the dished face and thicker than gear 72 upon which the gear wheel 72 is mounted loosely and may rotate. A second and larger hub 80 is provided on said wheel 74 offset from the first and acting as a mounting for ratchet gear 82 rigidly affixed thereto, so that it will lie immediately next to the gear wheel 72. A spring disc 84 of friction material is next mounted on the shaft 68 and held in contact with a circular surface 86 adjacent the periphery of the wheel 74. The disc 84 is held in position by pinion 88 which is pressed onto the shaft 68. The disc is kept from turning on the shaft 68 by a key 90 which engages the teeth of pinion 88.

A pawl and ratchet connection is provided between the gears 72 and 88 so that they will rotate as a unit in one direction but rotate independently in the opposite direction. A pawl 92 is pivotally mounted on the lower surface of the gear 72 and is adapted to engage the teeth of the ratchet wheel 82. An arcuate spring arm 94 rigidly affixed to the gear face 72 at points 96 bears upon the pawl 92 to maintain it in contact with the ratchet teeth.

Figure 4:
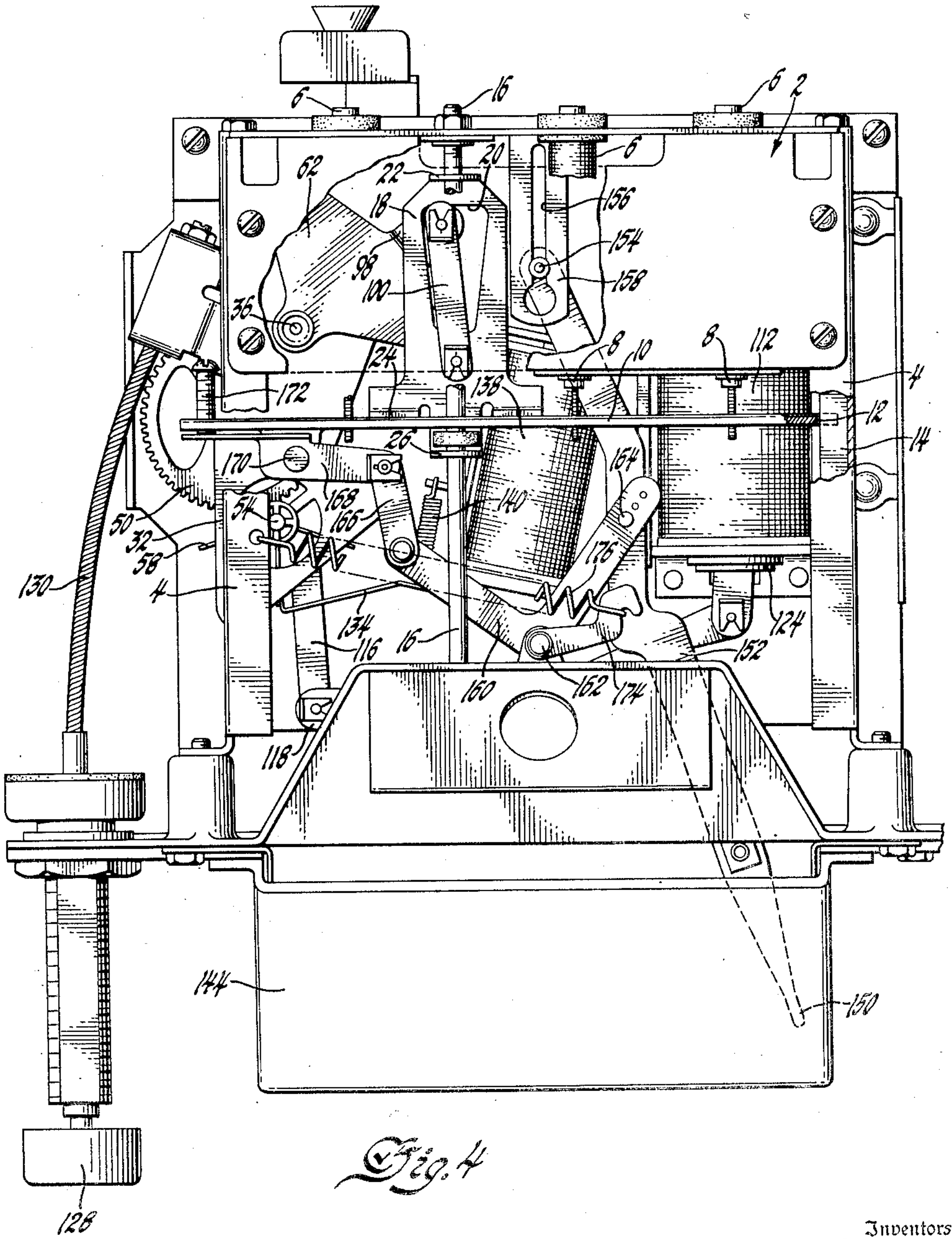
Figure 4 is a bottom plan view of the tuner with the casing removed taken on the line 4—4 of Figure 3.
Figure 5:
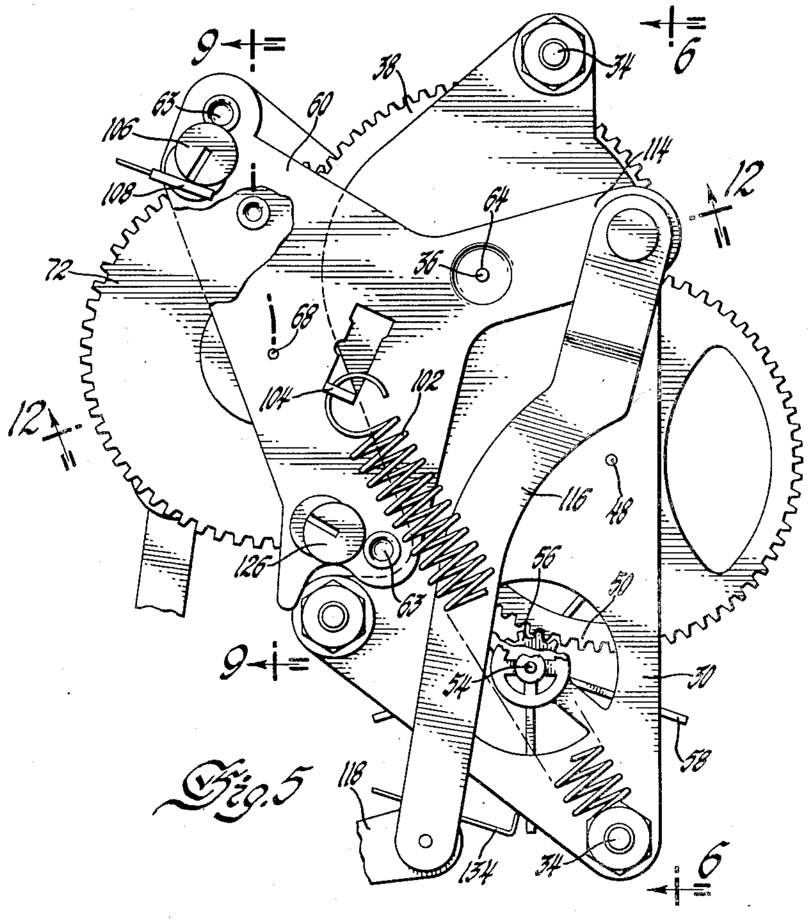
Figure 5 is an enlarged top plan view of the detail gear train and planetary assembly.
Figure 6:
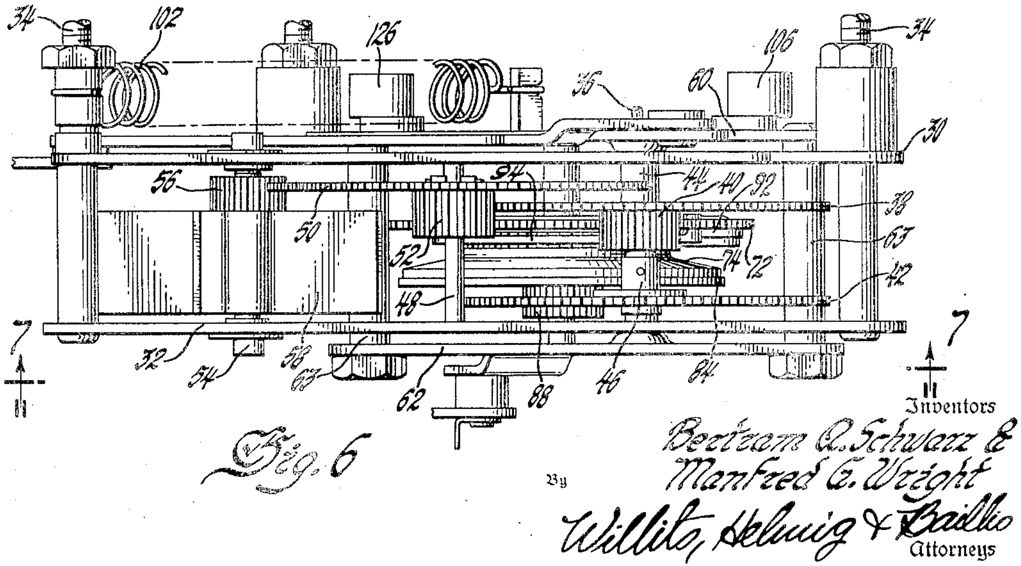
Figure 6 is a side elevation of the gear train and planetary assembly taken on the line 6—6 of Figure 5 in the direction of the arrows.
Figure 11:
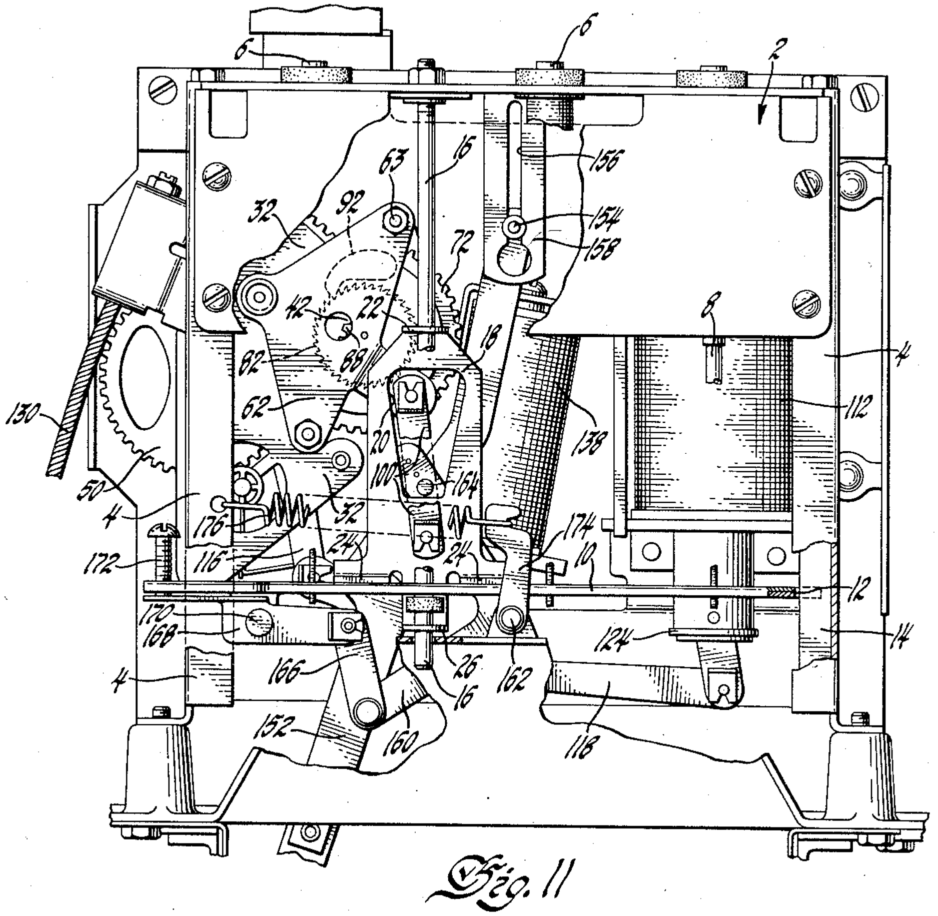
Figure 11 is a bottom plan view of the tuner with the casing removed and parts broken away.
Figure 12:
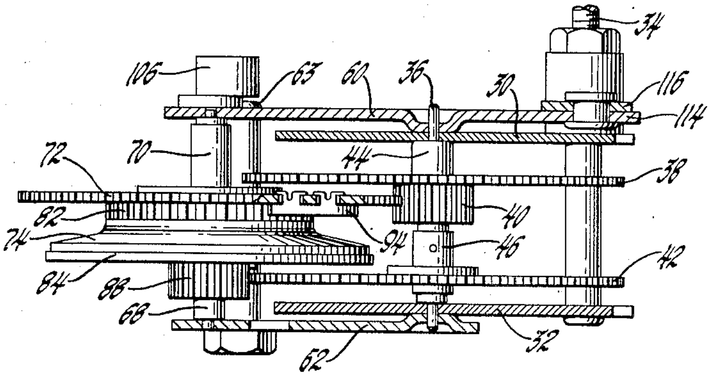
Figure 12 is a sectional view of a part of the gear train and planetary assembly taken on the line 12—12 of Figure 5.

The movement of the planetary assembly unit about the axis of the shaft 36 provides the driving motion or force for the tuning means. Referring particularly to Figure 4, it will be seen that the lower plate 62 of the planetary assembly is provided with an extending lug 98 to which is pivotally conected a link 100, the opposite end of which is likewise pivotally connected to the plate 18 of the crossbar assembly. Thus rotary movement of the planetary unit moves the crssbar and cores back and forth for tuning. The planetary assembly may be caused to move about its pivot and to drive the tuning means due to several different means. As previously mentioned in the specification, the drive for the tuning means in scanning the band is due to a spring member or resilient storage means. This force is supplied through a heavy coil spring 102, best shown in Figure 5, which has one end connected to an upturned tang 104 on plate 60 of the planetary assembly, and its opposite end connected to a stationary bolt 34 rigidly secured to the frame. Thus in Figure 5 the spring 102 will bias the planetary assembly to rotate in a counterclockwise direction, as viewed in that figure, when gear 42 is locked by the manual drive, and this planetary movement will cause the crossbar tuning assembly to move toward the front of the tuner, as viewed in Figure 11. This motion is damped or slowed to a rate acceptable for tuning by the gear train and governor 58 associated therewith.

Figure 2:
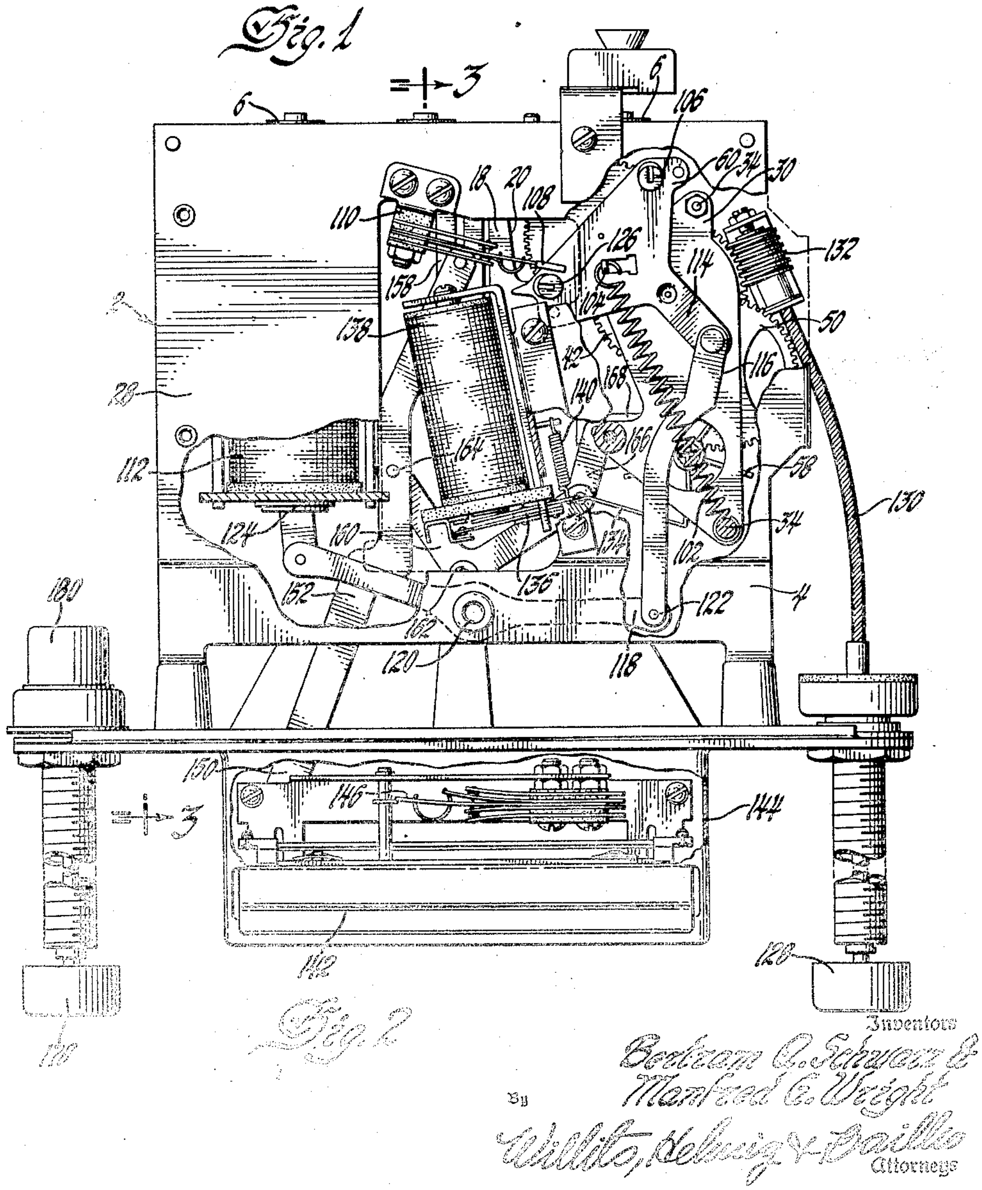
Figure 2 is a top plan view of the tuner with parts of the casing broken away to reveal the interior construction.
Figure 3:
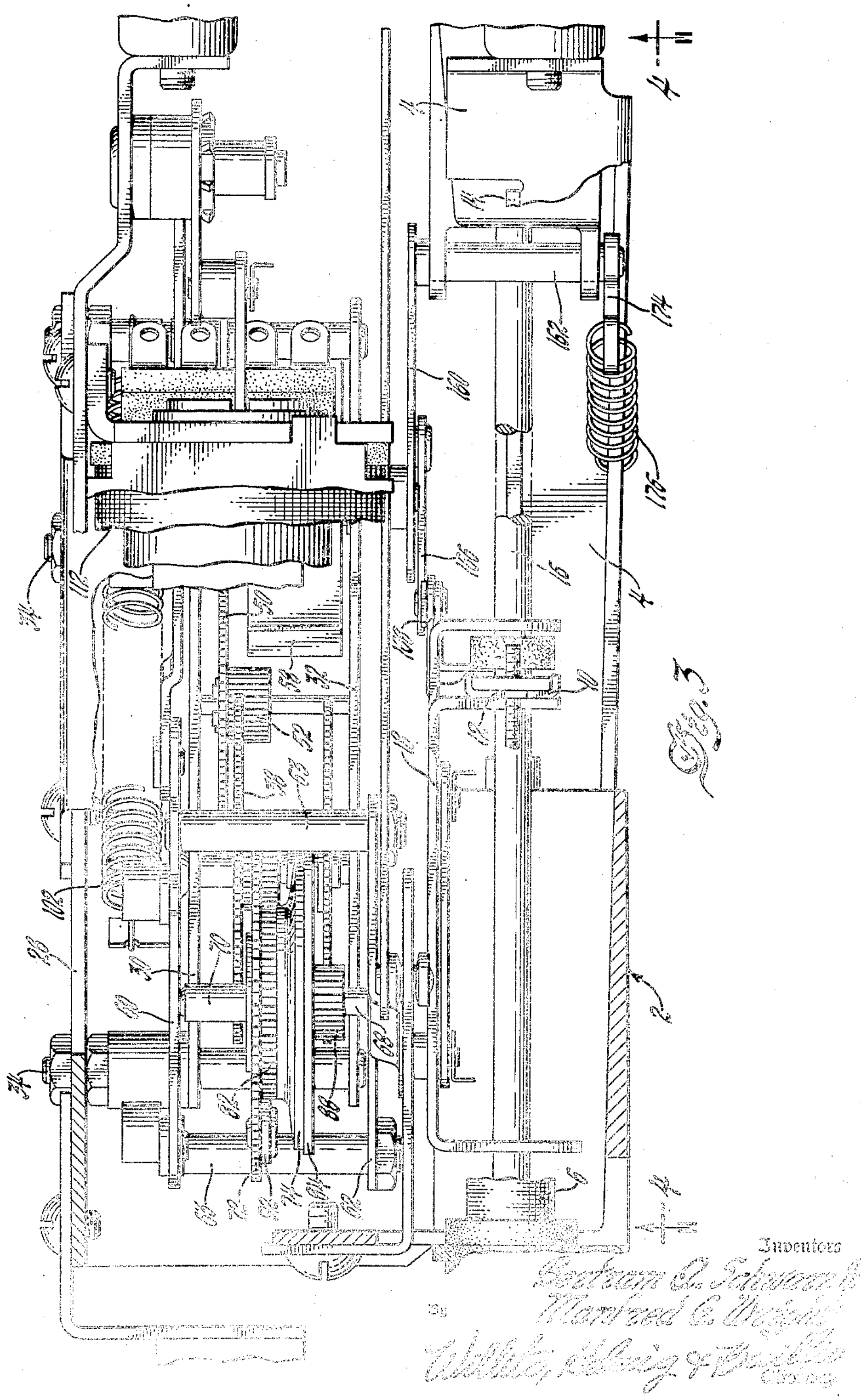
Figure 3 is an enlarged sectional view taken on the line 3—3 of Figure 2.

When the spring has rotated the planetary assembly as far as it is desired, an adjustable stop 106 in the form of a rotatable eccentric, adjustably secured to the planetary frame, will be brought into position to operate the movable arm 108 of a snapover switch assembly 110 which includes two contact means, said switching means remaining in the last-operated position for control purposes. Upon an actuation of the switch arm 108 by the adjustable stop 106, a circuit wil be completed energizing the operating solenoid 112, whose function it is to recock the spring and simultaneously move the planetary gear assembly to the opposite limit of movement. This is accomplished through a linkage system best shown in Figure 2. It will be seen that the plate 60 of the planetary assembly carries an elongated extension arm 114, which extends outwardly on the opposite side of the pivot and has pivotally connected thereto a link 116. A lever 118 pivoted at 120 on the main frame of the tuner and adjacent its center has one end pivotally connected at 122 to the link 116. The opposite end of the lever 118 is pivotally connected directly to the solenoid armature 124. Thus when the spring has moved the planetary assembly to its limit in one direction through the spring pressure on the tang 104, the solenoid will, through the linkage just described, rotate the planetary assembly in the opposite direction or clockwise, as viewed in either Figure 2 or Figure 5 to recock or charge the spring. When the solenoid has moved the planetary assembly to the opposite extreme position, a second adjustable stop 126 on the carriage is brought into contact with the actuating snapover arm 108 of the limit switch and throws it to its opposite position, opening the solenoid circuit to deenergize the same, and the mechanism will thus proceed through its next scanning cycle unless stopped by a signal.

Not only is it desirable to provide means for automatically scanning and indexing the tuning means, but it is also desired to simultaneously provide manual driving means for the same tuning means. The manual drive in this instance consists of a manually adjustable knob 128 connected through a flexible cable assembly 130 to a worm 132, supported for rotation on the frame. The worm is so located as to engage gear 42 and either rotate the same or lock it against rotation.

The indexing of the mechanism when it is operated automatically for tuning purposes is accomplished through physical engagement between one of the blades of the governor 58 and a pivoted arm 134 which is rigidly connected to and carried by the armature 136 of the control relay 138. It might be mentioned at this point that during tuning, relay 138 is maintained energized as long as no signal appears in the receiver, but upon the appearance of such a signal this control relay is deenergized, permitting a small spring 140 to pull the armature away from the relay and cause the pivoted arm detent 134 to fall into engagement with the blades of the governor and stop the same. If the operator does not particularly approve of the program being received by the station indexed, he may move on to the next station merely by pushing inwardly on the switch bar 142, movably mounted in a casing 144 in the front of the tuner, said bar 142 being spring biased outwardly and its motion operating a control switch 146 which again causes the energization of relay 138 to retract the detent from the governor and permit the drive to continue. Of course, when the automatic mechanism is not being utilized and the receiver is being tuned manually, the detent remains in locked position and the gear train stationary.

Specifically describing the operation of the driving mechanism during the two above identified types, either manual or automatic, let it first be assumed that it is desired to operate the mechanism automatically. In this case the worm 132 engaging the periphery of the gear 42 maintains the same locked in position. The spring 102, however, tends to cause the planetary carriage and assembly to move around its pivot, and as it does so the rotation of gear 88, which walks around the periphery of the gear 42 drives the large gear 72 mounted on the same shaft. Through its engagement with gear 88 and other gearing previously described, this completes the drive to the governor, which rotates at a desired speed. When the incoming signal causes the relay 138 to be deenergized, the detent 134 drops into physical engagement with the first vane of the governor to arrive at that position and indexes the tuner. The circuits for indexing these signal seeking tuners do not form a part of the present application but are similar to those disclosed in copending application Serial No. 106,223, entitled "Signal Seeking Tuner," filed July 22, 1949, in the name of James H. Guyton which issued September 15, 1953, as Patent No. 2,652,486. It will be noted in this connection that the drive between gear 88 and gear 72, both mounted on shaft 68, is a frictional drive through friction disc 84 and dished wheel 74, ratchet wheel 82 and pawl 92 on gear 72. When the planetary assembly has reached the limit of movement caused by the spring drive 102 and the solenoid is energized for quick return, the pawl and ratchet connection permits such quick return in the opposite direction, the pawl 92 sliding over the teeth of the ratchet wheel 82 to its opposite extreme position. Thus we have a drive in one direction and a quick return in the opposite.

If it is desired to tune the set manually through rotation of the control button 128, the detent 134 will remain in contact with the vanes of the governor, locking the main gear train against any rotation and with it, of course, gear 38 and pinion 40. However, rotation of the manual button 128 will cause the worm 132 to rotate, thus rotating the worm wheel 42. Gear 88 in mesh therewith will be turned, again driving gear 72 through the friction connection above described, and gear 72, which is in mesh with gear 40 on shaft 36, and since that is locked against rotation will tend to walk around the same. This will cause the planetary assembly to move around the axis of shaft 36 and tune the receiver. If the operator continues to rotate the knob 128 after the mechanism has reached a limit of movement, then the friction drive 84—86 will slip and prevent damage to the device.

Means are also provided by which the movement of the crossbar assembly will actuate an indicating mechanism so that the operator will know in which part of the band the tuner is located. This indicating mechanism consists of a dial 148 mounted in the front of the housing 144 below the switch 142 and calibrated with the identifying numerals for the spectrum covered. A movable needle 150 carried by the end of an arm 152 moves behind the dial 148 and gives the desired indication. The arm 152 has a pin 154 at its rearmost end, which is adapted to slide in a slot 156 in a bracket 158 on the frame. This is to provide a pivotal support and at the same time one capable of longitudinal movement, so that the needle 150 may have relatively straight line motion behind the dial plate. A bellcrank 160 pivotally mounted on the frame through a shaft 162 has one arm pivoted at 164 to the arm 152 at substantially midway of its length. The opposite arm of bellcrank 160 is connected through a link 166 to an adjustable arm 168 on the crossbar assembly 10. The arm 168 is pivoted as at 170 to the crossbar assembly and may be adjusted about this pivot through an adjusting screw 172 which is provided to cause the needle 150 to be indexed properly. The shaft 162, upon which the bellcrank is pivoted and to which it is rigidly affixed, is spring biased in one direction through the use of an arm 174, likewise rigidly secured to shaft 162 and rotatable with it, said arm 174 having a coil spring 176 connected thereto, the opposite end of which is secured to the frame. Thus, as the crossbar assembly moves back and forth to tune the receiver, it drives through a linkage and bellcrank the arm 152 to give an indication of the tuner position. Spring 176 acts in parallel with power spring 102 and provides part of the power for driving the tuning member and gear train, plus biasing out backlash through the mechanism from the pointer to the gear train. This biasing effect provides eccentric loading to the tuning carriage 10 and 18, forcing bearings 26 and 22 to ride rod 16 with side thrust, eliminating play at these points.

On the left hand side of the front panel, as shown in Figure 1, a second control knob 178 is provided which controls the off-on and volume control means 180. It will thus be evident that we have provided a tuning mechanism for a radio receiver which can be operated automatically to scan a desired frequency spectrum and which is indexed by the appearance of an incoming signal, and that at any time or in any location of the tuning means, a manual drive is likewise provided for tuning the receiver manually.

We claim:

1. In means for tuning a radio receiver over a predetermined band having a movable tuning member mounted in a frame, a gear train mounted on the frame, a planetary gear carriage pivotally mounted on the frame to engage the gear train, means connecting said carriage to the movable tuning member to drive the same, means for moving said carriage, switching means connected to and controlling the means for moving said carriage, and actuating means for the switching means carried by the carriage to cause actuation of the means for moving the carriage at predetermined positions of said carriage.

2. In means for tuning a radio receiver over a predetermined band having a movable tuning member mounted in a frame, a gear train mounted on the frame, a planetary gear carriage pivotally mounted on the frame to engage the gear train, linkage means interconnecting the planetary carriage and the tuning means, electrical means connected to said carriage for moving the same, switching means mounted on the frame connected to and controlling said electrical means, and switch actuating means mounted on said carriage for actuating said switching means at predetermined positions of the carriage.

3. In means for tuning a radio receiver over a predetermined band having a movable tuning member mounted in a frame, a gear train mounted on the frame, a planetary gear carriage pivotally mounted on the frame to engage the gear train, linkage means interconnecting the planetary carriage and the tuning means, solenoid means connected to the carriage for moving the same, switching means mounted on the frame connected to and controlling the solenoid means, and adjustable switch actuating means mounted on the carriage for engaging the switching means to control the solenoid at predetermined positions of the carriage.

4. In means for tuning a radio receiver over a predetermined band having a movable tuning member mounted in a frame, a gear train mounted on the frame, a planetary gear carriage pivotally mounted in said frame to engage the gear train, linkage means interconnecting the planetary carriage and the tuning means, solenoid means connected to the carriage for moving the same, switching means mounted on the frame connected to and controlling the solenoid means, and a plurality of spaced adjustable switch actuating means mounted on the carriage to engage and operate the switch at predetermined positions of the carriage.

5. In means for indexing an adjustable part, a frame upon which the part is mounted for adjustment, a gear train load mounted upon the frame, a planetary gear carriage pivotally mounted on the frame adjacent the gear train for engagement therewith, a linkage connection between the carriage and the part, driving means connected to the carriage, switching means connected to and controlling the driving means, and switch actuating means mounted on the carriage to engage the switching means and operate the same at predetermined positions of the carriage.

6. In means for indexing an adjustable part, a frame upon which the part is mounted for adjustment, a gear train load mounted upon the frame, a planetary gear carriage pivotally mounted on the frame adjacent the gear train for engagement therewith, a linkage connection between the carriage and the part, solenoid means connected to the carriage, switching means connected to and controlling the solenoid mounted on the frame, and adjustable switch actuating means mounted on the carriage to engage and operate the switching means at predetermined positions of the carriage.

7. In means for indexing an adjustable part, a frame upon which the part is mounted for adjustment, a gear train load mounted upon the frame, a planetary gear carriage mounted adjacent the gear train for engagement therewith, a linkage connection between the carriage and the part, driving means connected to the carriage, a shaft carried by the planetary carriage, a plurality of gears carried by the shaft, one fixed to rotate with the shaft and the second free to rotate thereon, a friction drive between the two gears to cause one to drive the other but to permit relative movement, said gears engaging gears in the gear train.

8. In means for indexing an adjustable part, a frame upon which the part is mounted for adjustment, a gear train load mounted upon the frame, a planetary gear carriage mounted adjacent the gear train for engagement therewith, a linkage connection between the carriage and the part, driving means connected to the carriage, a shaft carried by the planetary carriage, a plurality of gears carried by the shaft, one fixed to rotate with the shaft and the second free to rotate thereon, a friction drive connected to one of the gears, a pawl and ratchet connection between the friction drive and the second gear to provide one way drive and friction drive between the two gears, said gears being mounted to engage gears of the gear train.

9. In means for tuning a radio receiver over a predetermined band having a movable tuning member mounted in a frame, a gear train mounted on the frame, a planetary gear carriage mounted to engage the gear train, a plurality of gears mounted in the planetary carriage, friction and pawl and ratchet means interconnecting said last named gears which mesh with gears in the gear train, means connecting said carriage to the movable tuning member to drive the same, means for moving said carriage and switching means for controlling the means for moving said carriage actuated by movement of the carriage to predetermined positions.

References Cited in the file of this patent

UNITED STATES PATENTS

| | | |
|---|---|---|
| 1,523,305 | Spiro | Jan. 13, 1925 |
| 2,479,465 | Boeck et al. | Aug. 16, 1949 |